United States Patent [19]

MacFarland

[11] 4,006,918
[45] Feb. 8, 1977

[54] INFLATABLE CONFINEMENT FOR VEHICLE OCCUPANT RESTRAINT SYSTEM AND METHOD OF MAKING SAME

[75] Inventor: Robert W. MacFarland, Grosse Pointe Park, Mich.

[73] Assignee: Eaton Corporation, Cleveland, Ohio

[22] Filed: Feb. 28, 1973

[21] Appl. No.: 336,859

[52] U.S. Cl. .............................. 280/729; 280/743; 150/1; 139/389
[51] Int. Cl.² ....................................... B60R 21/08
[58] Field of Search ............ 280/150 AB, 729, 743; 139/389; 150/1

[56] References Cited

UNITED STATES PATENTS

| 735,560 | 8/1903 | Muller | 139/389 |
| 3,610,657 | 10/1971 | Cole | 280/150 AB |
| 3,618,979 | 11/1971 | Gulette | 280/150 AB |
| 3,642,303 | 2/1972 | Irish | 280/150 AB |
| 3,666,289 | 5/1972 | Magyar | 280/150 AB |
| 3,734,394 | 5/1973 | Dooly | 150/1 |
| 3,767,225 | 10/1973 | Mazelsky | 280/150 AB |

FOREIGN PATENTS OR APPLICATIONS 1,229,573 9/1960 France ................................. 150/1

*Primary Examiner*—Joseph F. Peters
*Assistant Examiner*—John P. Silverstrim
*Attorney, Agent, or Firm*—Teagno & Toddy

[57] ABSTRACT

An inflatable vehicle occupant restraint confinement having separate inner and outer inflatable chambers formed from a single sheet of material. Fluid port means communicating with both the inner and outer chambers is provided in the form of a cylindrical diffuser. The method of making the confinement includes folding a flat pattern of a single layer of material about its midline and seaming the margins except for a portion adapted for receiving the port means. The folded wall of the confinement thus formed is then folded inwardly to form a pocket and define new folded margins of the pocket which are then seamed together to form the pocket into an inner chamber and an outer chamber formed by the remainder of the material surrounding the inner chamber.

15 Claims, 11 Drawing Figures

U.S. Patent Feb. 8, 1977 4,006,918
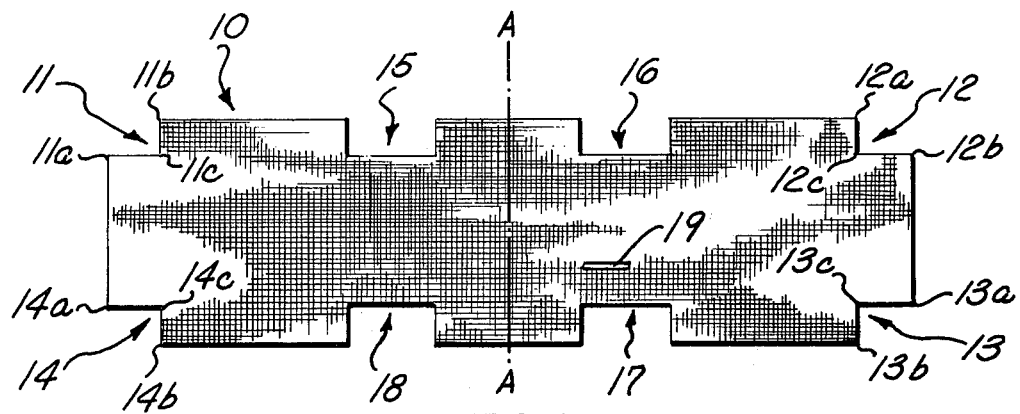
FIG. 1
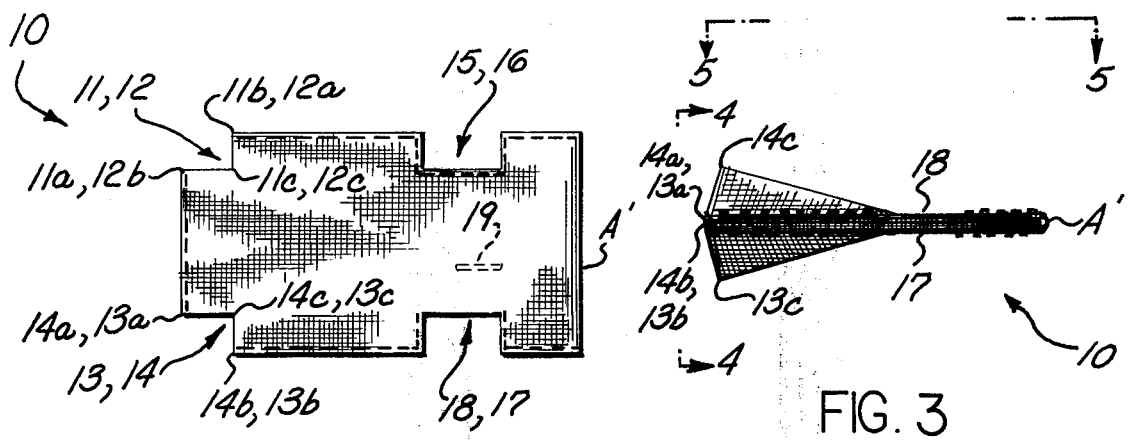
FIG. 2
FIG. 3
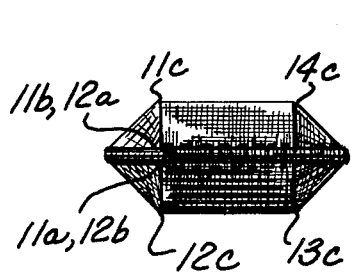
FIG. 4
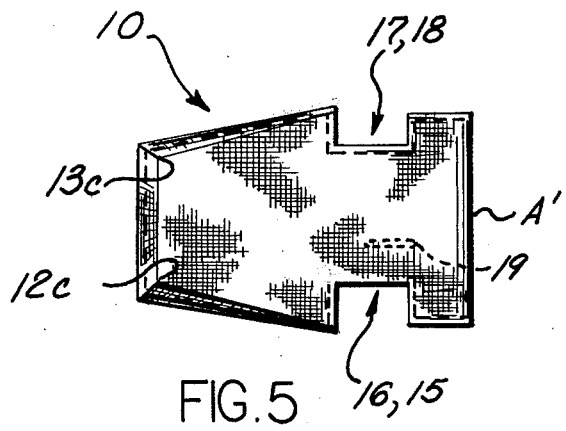
FIG. 5

INFLATABLE CONFINEMENT FOR VEHICLE OCCUPANT RESTRAINT SYSTEM AND METHOD OF MAKING SAME

BACKGROUND OF THE INVENTION

The present invention relates to an inflatable vehicle occupant restraint system of the type wherein an inflatable confinement is expanded from a collapsed to an operative position by the introduction of pressurized fluid into the inflatable confinement in response to a collision. It has been found that a dual chambered configuration for the confinement is desirable in order that the confinement expand as rapidly as possible upon onset of the collision and further to provide two-stage impact absorbing function to the inflatable confinement. Previously utilized techniques for providing a dual-chambered inflatable confinement have used multipiece construction which requires cutting of a multiplicity of pattern pieces and seaming of the pieces together. This has required many seams which make the confinement relatively costly to manufacture. It has therefore been desirable to find a technique for fabricating a dual-chambered inflatable confinement in a manner which requires fewer seams in the material and less cutting of separate pieces of material.

SUMMARY OF THE INVENTION

The present invention provides an inflatable vehicle occupant restraint confinement having an inner chamber and an outer chamber surrounding the inner chamber. The inflatable confinement of the present invention is fabricated by folding a single layer of fabric from a flat pattern and seaming the folds and margins of the folded pattern. The folded and seamed confinement has a slit provided in the inner chamber and a portion of the margin of the outer chamber unseamed to permit insertion of a fluid port means in the form of a diffuser into the two chambers of the confinement for permitting inflation thereof. The present invention thus provides a solution to the above-described problem and enables the manufacture of an inflatable confinement having an inner and outer chamber from a single flat-pattern in a manner requiring a minimum of cutting and seaming.

BRIEF DESCRIPTION OF THE DRAWINGS

FIG. 1 is a plan view of the flat pattern used for fabricating the inflatable confinement;

FIG. 2 illustrates the pattern of FIG. 1 in the first step of folding and seaming;

FIG. 3 is a side view of the folded and seamed confinement as it appears after completion of the first stage of fabrication;

FIG. 4 is an end view of the confinement of FIG. 3;

FIG. 5 is an underside view of the confinement of FIG. 3, showing the location of the port-receiving slit;

DETAILED DESCRIPTION

Figure 6:
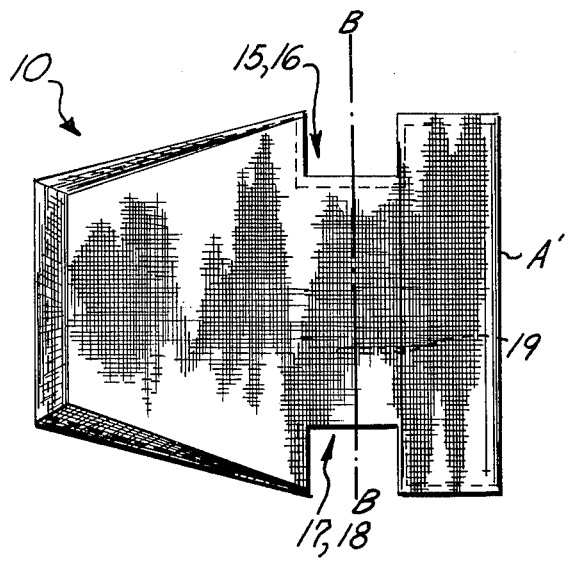
FIG. 6 is a plan view of the confinement of FIG. 5 and shows the line B—B about which the second stage of folding is performed.

Referring now to FIG. 1, a flat pattern 10 of suitable material is shown as having a generally rectangular configuration with preferably a two-to-one length to width ratio. However, other pattern shapes may be used if desired, the pattern shape being governed by the desired shape of the inflated confinement. The rectangular pattern has notches 11, 12, 13, 14 formed respectively in each corner thereof. Two pairs of preferably rectangular notches 15, 16 and 17, 18 are formed along each longer edge of the flat pattern with the individual members of each pair of notches spaced preferably equidistant from the midlength of the flat pattern. A slit 19 is formed in the central region of the pattern and is spaced intermediate one of the pairs of notches 16, 17 formed on opposite longitudinal edges of the pattern.

In the present practice of the invention, the slit 19 has a length such that the slit is capable of being formed to a circle and having the neck of a fluid port received therein. The slit 19 is located on the flat pattern in a predetermined location such that, when the pattern is folded and seamed, the slit will be in the desired location for receiving therein a fluid port means.

Referring now to FIG. 2, the flat pattern is folded about its midlength, shown as line A—A of FIG. 1, thereby forming a folded edge A'. It will be readily apparent that the preferred practice is to make the flat pattern symmetric about its midline in such a manner that, when the pattern is folded thereabout, the folded halves match identically. The margins of the longitudinal edges, the shorter edges and one of the recesses 15, 16 are then seamed (indicated by a dashed line) by a method suitable for the material. It will be noted that a portion of the bottom of the recess 18, 17 is not seamed as shown in FIG. 2 to provide an opening adapted to later receive port means therein, nor are the corner notches seamed, as they must be left unseamed to permit further forming operations. In the presently preferred practice of the invention the confinement is formed of woven fabric and the seaming is performed by sewing the margins together. However, for different materials other seaming techniques may be appropriate, as for example, heat and pressure bonding.

Referring now to FIGS. 3, 4 and 5, the folded flat pattern of FIG. 2 is shown in the partially expanded configuration wherein all the seaming operations of the flat pattern have been completed. The basic confinement of FIGS. 3, 4 and 5 is formed by separation of the folded sides of the folded flat pattern of FIG. 2 in such a manner that the individual outer corners of the corner notches 11 and 12 are drawn together thereby forming a straight line junction of the sides 11c - 11a and 11c - 11b, 12c - 12a and 12c - 12b of the notches which are then seamed to form the edge of the confinement along a common line between individual inner corners of the notches, which then become the outer corners of the confinement. The corner notches 13 and 14 are notch sides 13c - 13a and 13c - 13b, 14c - 14a and 14c - 14b and are similarly drawn together along a common line which is also then seamed to form an edge of the confinement. The interior corners 11c, 12c of the notches 11, 12 and the interior corners 14c, 13c of the corner notches 13, 14 are thus separated to form the outer corners of the confinement. It will be seen that by spreading the sides of the flat pattern to separate the interior corners of the notches, the edge seams of the confinement are drawn together to form the corner thereof. Reference may again be had to FIGS. 3, 4 and 5 where the configuration of the partially completed confinement is illustrated for clarity. The confinement thus formed is then turned insideout to invert the seams as shown in FIG. 6, thus providing a smooth contour to the outer surface of the confinement for preventing injury to the occupant. The confinement is inverted, or turned inside-out, through the opening formed by the unseamed margin forming the bottom of notches 18, 17.

Figure 7:
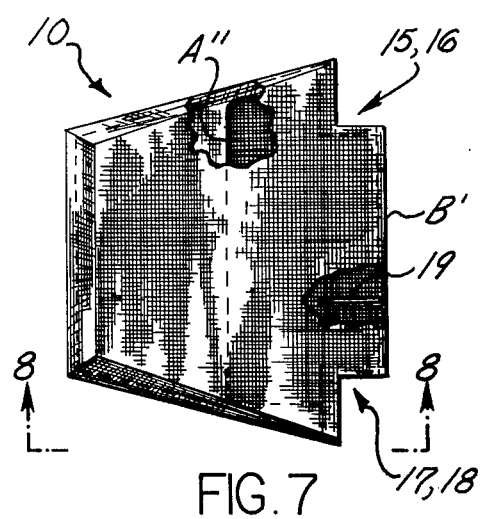
FIG. 7 is a plan view of the confinement of FIG. 6 after the completion of the second stage folding operations and shows a portion of the inner pocket through a break-away and the remainder of the inner pocket in dashed line.
Figure 8:
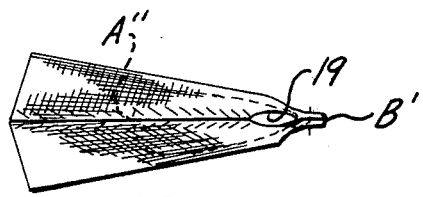
FIG. 8 is a side view of the confinement of FIG. 7 as it appears upon completion of the seaming.

Referring now to FIGS. 6, 7 and 8, portions of the partially completed and inverted confinement are again folded about a line passing through the centers of the edge notches 15, 16, 17, 18 and designated line B—B in FIG. 6. The folding is accomplished by inverting a portion of the pattern about fold A' so as to form a pocket. Fold A' is thus reversed to become fold A'' as shown in FIG. 7. The pocket thus formed is disposed within the confinement and new folded margins B' are defined for the pocket and confinement. The newly defined margins at B' are then seamed together to thus close the pocket and to form an inner chamber, with the remaining material of the confinement forming an outer chamber therearound. The slit 19 is thus disposed in the inner chamber at a position adjacent the edge notches 17, 18 which had been left unseamed, and the slit 19 and the unseamed notches 17, 18 are thus adapted to receive port means therein in the completed confinement.

Alternately, however, the slit 19 may be omitted until the confinement is in the form shown in FIGS. 7 and 8. The slit 19 may then be formed in its desired location by inserting a tool in the pocket or through the unseamed margins of the cutout 17, 18. This alternate sequence of fabrication does not require predetermining the location of the slit on a flat pattern and permits the slit to be formed in the inner chamber wall at a location matching the unseamed margins of the cut-out 17, 18 when the confinement is completely fabricated.

Figure 9:
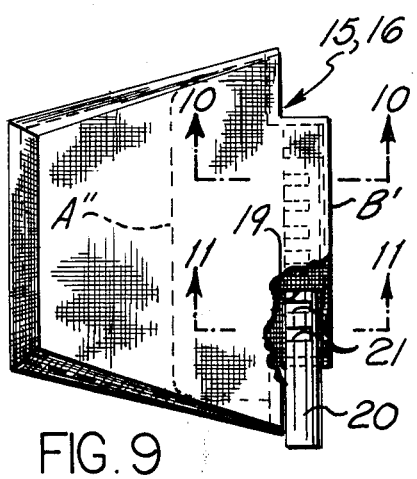
FIG. 9 is a plan view of the completed confinement with a portion thereof broken away to show the installation of the port means.
Figure 10:
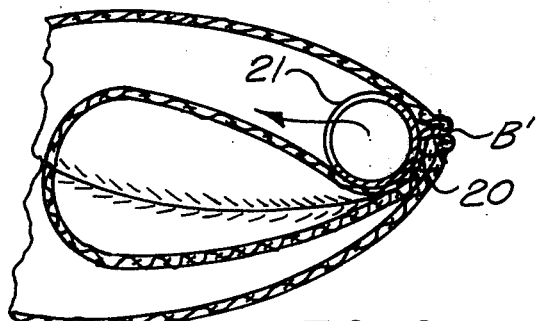
FIG. 10 is a fragmentary sectional view taken along section indicating lines 10—10 of FIG. 9.
Figure 11:
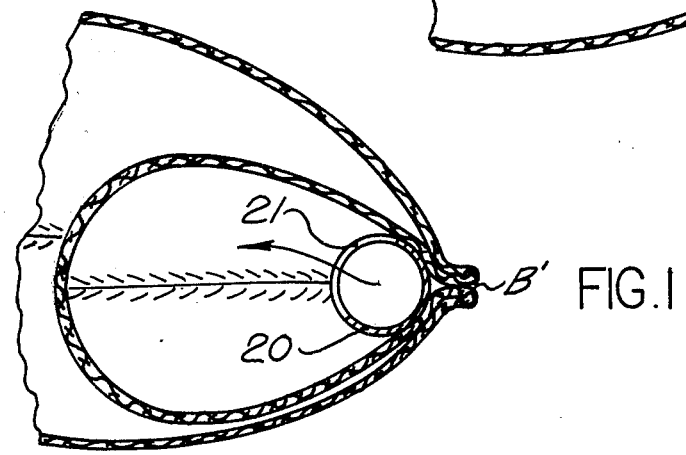
FIG. 11 is a fragmentary sectional view taken along section indicating lines 11—11 of FIG. 9.

Referring now to FIGS. 9, 10, 11, the completed confinement is shown with the fluid port means 20 extending through the slit 19 and into the interior of the inner and outer chamber. The port means 20 is preferably in the form of cylindrical tubular diffuser having a plurality of openings 21, preferably rectangular slots, formed in the wall thereof, preferably with the longer dimensioned edge of the slot disposed in a direction circumferentially of the tube. The diffuser tube 20 is inserted through the unseamed margins of the cut-out 17, 18 and through the slit 19. The diffuser thus has a slotted portion of its length extending through the slit 19 and into the inner chamber and a slotted portion thereof extending between the inner chamber wall and the unseamed margin of the cut-out 17, 18. By this arrangement the slots 21 are disposed so as to permit fluid to flow from the interior of the diffuser tube 20, through the slots 21, into both the inner chamber and the outer chamber of the confinement. As is known in the art, the size and number of the slots 21 may be varied so as to impart a desired inflation rate and sequence to the two chambers of the confinement. For example, in systems where a frangible cover is provided over the confinement in its collapsed condition, it is desirable to have the inner chamber inflated at a more rapid rate than the outer chamber. In this sequence of inflation, the inner chamber of the confinement expands the confinement material rapidly so as to open the cover and also move the collapsed confinement clear of any obstruction by the cover such that continued expansion of the outer chamber of the confinement may occur in an unhindered manner.

Referring now to FIGS. 9, 10 and 11, the port means, in the form of a tubular diffuser 20, is shown in communication with the inner chamber of the confinement by insertion through the slit 19. In the installed position, the diffuser 20, as shown, passes over a portion of the wall of the inner chamber to permit the slots 21 along the portion of its length outside the inner chamber to communicate fluid with the outer chamber for inflation thereof. When the diffuser tube 20 has been fully inserted through the opening in the cut-out 17, 18 in the margin of the outer chamber and into the slit 19 in the inner chamber of the confinement, the margins of the cut-out 17, 18 are then sealed about the outer periphery of the diffuser to prevent undesirable escape of the inflating fluid from the outer chamber. Thus the diffuser 20 serves as a fluid port for communicating fluid from a fluid source simultaneously to the inner and outer chambers, in addition to serving as a fluid flow diffuser.

The present invention thus provides an inflatable vehicle occupant restraint confinement having an inner chamber and a surrounding outer chamber wherein the confinement is formed from a flat pattern of a single sheet of material and is fabricated by folding and seaming the single sheet of material. The fabricated confinement has openings provided therein which receive a fluid port means, preferably in the form of a cylindrical diffuser tube. The present invention thus provides an inexpensive means of fabricating a dual-chambered inflatable confinement for a vehicle occupant restraint system.

Modifications and variations of the present invention will be apparent to those having ordinary skill in the art and the invention is limited only by the following claims.

What is claimed is:

1. In combination an inflatable confinement for a vehicle occupant restraint system and port means for communicating inflating fluid thereto, wherein
   a. said inflatable confinement is formed of a single layer of material with the margins thereof joined in fluid pressure sealing arrangement and with portions thereof disposed to form an inner fluid chamber and an outer fluid chamber with an aperture formed in the wall of each of said chambers with said port means received therethrough, and
   b. said port means has a longitudinal portion thereof communicating only with said inner chamber and a portion thereof communicating only with said outer chamber for permitting introduction of inflating fluid simultaneously thereto.

2. The combination defined in claim 1, wherein said port means includes diffuser means for diffusing the flow of fluid entering said inner and outer chambers.

3. The combination defined in claim 2, wherein said diffuser means is tubular in shape and receives fluid internally thereof and has a plurality of openings formed in the wall thereof for passage of fluid therethrough to said chambers.

4. The combination defined in claim 3, wherein each of said openings has a rectangular configuration.

5. The combination defined in claim 4 wherein said rectangular openings have the longer dimension thereof disposed circumferentially of the tube.

6. The combination defined in claim 1, wherein said confinement has the aperture in said outer chamber formed in the margins of said material.

7. The method of making an inflatable vehicle occupant restraint comprising the steps of:
   a. providing a flat pattern of material suitable for forming into an inflatable confinement;
   b. folding said pattern onto itself to a double layer of said material;
   c. seaming said folded material along the margins thereof to form a confinement leaving unseamed a predetermined portion of the margins thereof;
   d. inverting said confinement through the opening formed by said unseamed portion of the margin such that the seamed portions of said material are within the confinement;
   e. folding inwardly a portion of said confinement wall material such that a pocket is formed in said confinement and new folded margins are defined at the opening of said pocket;
   f. seaming said new margins such that said pocket forms an inner chamber and said confinement wall forms an outer chamber surrounding said inner chamber;
   g. forming an aperture of predetermined size in the wall of said confinement at a location adjacent said unseamed portion of said margin; and,
   h. inserting fluid port means through said unseamed portion and said aperture and sealing at least the former about said port means in fluid pressure retaining relationship.

8. The method defined in claim 7, wherein said step of folding inwardly a portion of said wall comprises folding inwardly the wall along the fold formed in step (b) of claim 7.

9. The method defined in claim 7, wherein
   a. the step of providing a flat pattern comprises providing a pattern symmetrical about a line through its midlength; and,
   b. the step of folding said material onto itself comprises folding about said midlength line.

10. The method of making an inflatable vehicle occupant restraint comprising the steps of:
    a. providing a flat pattern of material suitable for forming into an inflatable confinement;
    b. folding said pattern onto itself to a double layer of said material;
    c. seaming said folded material along the margins thereof to form a confinement leaving unseamed a predetermined portion of the said margins;
    d. forming an aperture of predetermined size in the wall of said confinement at a location adjacent said unseamed portion of said margin;
    e. inverting said confinement through the opening formed by said unseamed portion of the margin such that the seams of said material are disposed within the confinement;
    f. folding inwardly a portion of said confinement wall material such that a pocket is formed in said confinement and new folded margins are defined at the opening of said pocket;
    g. seaming said new margins such that said pocket forms an inner chamber and said confinement wall forms an outer chamber surrounding said inner chamber; and,
    h. inserting fluid port means through said unseamed portion and said aperture and sealing at least said unseamed margins about said port means in fluid pressure retaining relationship.

11. The method defined in claim 10, wherein said seaming of the margins comprises sewing said material.

12. The method defined in claim 10, wherein said folding to a double layer comprises the step of folding said material about its midline.

13. The method defined in claim 10, wherein said step of folding inwardly a portion of said wall comprises folding inwardly the wall along the fold formed in step (b) of claim 10.

14. The method defined in claim 10 wherein,
    a. the step of providing a flat pattern comprises providing a pattern symmetrical about a line through its midlength; and,
    b. the step of folding said material onto itself comprises folding about said midlength line.

15. The method defined in claim 14, wherein said seaming comprises sewing said material.

* * * * *